United States Patent
Haneda et al.

(10) Patent No.: US 8,832,355 B2
(45) Date of Patent: Sep. 9, 2014

(54) STORAGE DEVICE, STORAGE CONTROLLING DEVICE, AND STORAGE CONTROLLING METHOD

(75) Inventors: Terumasa Haneda, Kawasaki (JP); Nina Tsukamoto, Kawasaki (JP); Yuji Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 12/805,948

(22) Filed: Aug. 25, 2010

(65) Prior Publication Data

US 2010/0332739 A1 Dec. 30, 2010

Related U.S. Application Data (63) Continuation of application No. PCT/JP2008/053493, filed on Feb. 28, 2008.

(51) Int. Cl.
*G06F 12/02* (2006.01)

(52) U.S. Cl.
USPC .................................. 711/103; 711/E12.008

(58) Field of Classification Search
USPC .................................................. 711/103, 118
See application file for complete search history.

(56) References Cited

U.S. PATENT DOCUMENTS

| | | | | |
|---|---|---|---|---|
| 5,426,378 | A * | 6/1995 | Ong ................................ | 326/39 |
| 6,732,263 | B1 | 5/2004 | May et al. | |
| 2002/0156983 | A1 | 10/2002 | Jones et al. | |
| 2006/0015683 | A1 * | 1/2006 | Ashmore et al. .............. | 711/113 |

FOREIGN PATENT DOCUMENTS

| | | |
|---|---|---|
| JP | 7-168764 | 7/1995 |
| JP | 10-161938 | 6/1998 |
| JP | 2001-92648 | 4/2001 |
| JP | 2002-99464 | 4/2002 |
| JP | 2004-506256 | 2/2004 |
| JP | 2004-118644 | 4/2004 |
| JP | 2004-531814 | 10/2004 |
| JP | 2005-353115 | 12/2005 |
| WO | 02-01365 A2 | 1/2002 |
| WO | 02/086721 A1 | 10/2002 |

OTHER PUBLICATIONS

Japanese Office Action mailed Nov. 8, 2011 issued in corresponding Japanese Patent Application No. 2010-500487.
International Search Report for PCT/JP2008/053493, mailed Jul. 22, 2008.
Japanese Office Action mailed Jun. 12, 2012 issued in corresponding Japanese Patent Application No. 2010-500487.

* cited by examiner

*Primary Examiner* — Kenneth Lo
(74) *Attorney, Agent, or Firm* — Staas & Halsey LLP (57) ABSTRACT

A storage device includes a programmable device into which predetermined control data is written, a control data storing unit that stores therein write control data and read control data, the write control data being control data for realizing a function to save data stored in a cache memory into a non-volatile memory when an abnormal shut-down occurs and the read control data being control data for realizing a function to restore the data saved in the nonvolatile memory into the cache memory when an electric power source is turned on after the abnormal shut-down, a writing unit that, when an electric power source is turned on after occurrence of the abnormal shut-down of the storage device, writes the read control data into the programmable device, and a restoring instructing unit that instructs the programmable device to restore the data saved in the nonvolatile memory into the cache memory.

17 Claims, 9 Drawing Sheets

| POWER OUTAGE FLAG | DATA SAVING COMPLETION FLAG |
|---|---|
| 1 | 1 |

STORAGE DEVICE, STORAGE CONTROLLING DEVICE, AND STORAGE CONTROLLING METHOD

CROSS-REFERENCE TO RELATED APPLICATION

This application is a continuation of International Application No. PCT/JP2008/053493, filed on Feb. 28, 2008, the entire contents of which are incorporated herein by reference.

FIELD

The embodiment discussed herein is directed to a storage device, a storage controlling device, and a storage controlling method.

BACKGROUND

Conventionally, in large-scale computer systems, data is managed by a dedicated data input/output device that is structured separately from a host computer. Among such data input/output devices is a storage device that forms a group of Redundant Arrays of Independent (or Inexpensive) Disks (RAID) with a plurality of hard disk devices (i.e., storage media) so as to improve reliability of data that is handled and the accessibility to the data.

Generally speaking, such a storage device improves the accessibility to the data by performing a write process (i.e., a writing process) while using a method called a write-back method. More specifically, in the case where the storage device has received a data write instruction from a host computer, which is a superordinate device of the storage device, the storage device notifies the host computer that the write process has been completed at a point in time when the data has been stored into a cache memory. After that, at a point in time when a predetermined condition has been satisfied, the data stored in the cache memory is stored into the hard disk device. By using the write-back method, it is possible to realize a data-access performance that is at a higher speed than in a situation where a write-through method is used. According to the write-through method, the host computer is notified that a write process has been completed after the writing of the data to the hard disk device has been completed.

Storage devices that use the write-back method as described above have a possibility of losing data if the electric power source is turned off without performing a normal shut-down operation due to a power outage or the like, while the data stored in the cache memory has not yet been stored into the hard disk device. (The electric power source being turned off without a normal shut-down operation will be hereinafter referred to as an "abnormal shut-down".) The reason is that the cache memory is usually structured with a volatile memory and thus loses the data therein when the electric power supply from the electric power source is stopped.

To cope with this situation, some storage devices are structured in such a manner that, in the case where an abnormal shut-down has occurred, the data in the cache memory is saved into a nonvolatile memory while electric power is being supplied from a large-capacity capacitor that is able to supply the electric power even after the electric power source has been turned off so that, when the electric power source is turned on after the abnormal shut-down, the data saved in the nonvolatile memory is restored into the cache memory. A battery device may be used in place of a capacitor; however, because battery devices have the problem of degradation of battery cells or the like, there is a tendency that capacitors, which degrade less from electrical charging and discharging, are more popularly used in recent years.

As explained above, the storage devices that use the write-back method are able to realize a high-speed access performance to the host computer and are able to prevent the data from being lost when an abnormal shut-down has occurred. As to the examples of the above-described technology, see Japanese Laid-open Patent Publication No. 2004-506256 and Japanese Laid-open Patent Publication No. 2001-092648, for example.

The conventional storage devices described above, however, have a problem where a large-scale data transfer circuit needs to be used so as to allow the data transfer processes at a high speed when an abnormal shut-down has occurred and when the storage device starts up after an abnormal shut-down.

More specifically, to perform the data transfer processes at a high speed, it is a good idea to provide, in dual manner, two data transfer circuits that perform the process of saving the data in the cache memory into a nonvolatile memory (hereinafter, a "data saving process") and two data transfer circuits that perform the process of restoring the data saved in the nonvolatile memory into the cache memory (hereinafter, a "data restoring process"), so that the data transfer processes are performed in parallel; however, this structure has a problem that the circuit scale becomes large.

If it is possible to perform the data saving process at a higher speed, it will be possible to save a larger volume of data into a nonvolatile memory in a short period of time during which the electric power is supplied from the capacitor. Further, if it is possible to perform the data restoring process at a higher speed, it will be possible to shorten the time period it takes for the storage device to start up after an abnormal shut-down. For these reasons, it is desirable that the data transfer processes described above be performed at a high speed.

In recent years, it has been common practice to realize data transfer circuits by using Field Programmable Gate Arrays (FPGAs) for the purpose of reducing development man-hours or the like. To realize the four data transfer circuits described above by using such an FPGA, it is necessary to use an FPGA that has, again, a large scale. Thus, problems arise where an FPGA having a large installation area needs to be installed into the storage device and where the cost increases. Making storage devices compact and reducing the cost have become common goals. Increases in the installation area and in the cost are problematic.

As explained above, in the field of storage devices, it has been a focus of attention how to realize a technique for efficiently performing the data saving process and the data restoring process without the need to enlarge the data transfer circuits.

SUMMARY

According to an aspect of an embodiment of the invention, a storage device includes: a programmable device into which predetermined control data is written; a control data storing unit that stores therein write control data and read control data, the write control data being control data for realizing a function to save data stored in a cache memory into a nonvolatile memory when an abnormal shut-down occurs and the read control data being control data for realizing a function to restore the data that has been saved in the nonvolatile memory into the cache memory when an electric power source is turned on after the abnormal shut-down; a writing unit that, when an electric power source is turned on after occurrence of the abnormal shut-down of the storage device, writes the read control data stored in the control data storing unit into the programmable device; and a restoring instructing unit that instructs the programmable device into which the read control data has been written by the writing unit to restore the data that has been saved in the nonvolatile memory into the cache memory.

According to another aspect of an embodiment of the invention, a storage controlling device controlling a storage device includes: a programmable device into which predetermined control data is written; a control data storing unit that stores therein write control data and read control data, the write control data being control data for realizing a function to save data stored in a cache memory into a nonvolatile memory when an abnormal shut-down occurs and the read control data being control data for realizing a function to restore the data that has been saved in the nonvolatile memory into the cache memory when an electric power source is turned on after the abnormal shut-down; a writing unit that, when an electric power source is turned on after occurrence of the abnormal shut-down of the storage device, writes the read control data stored in the control data storing unit into the programmable device; and a restoring instructing unit that instructs the programmable device into which the read control data has been written by the writing unit to restore the data that has been saved in the nonvolatile memory into the cache memory.

According to still another aspect of an embodiment of the invention, a storage controlling method for a storage controlling device that controls a storage device, the method includes: writing, when an electric power source is turned on after occurrence of an abnormal shut-down of the storage device, read control data stored in a control data storing unit into a programmable device into which predetermined control data is written, the read control data being control data for realizing a function to restore the data that has been saved in a nonvolatile memory into the cache memory when an electric power source is turned on after the abnormal shut-down; and instructing the programmable device into which the read control data has been written in the writing to restore the data that has been saved in the nonvolatile memory into the cache memory.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The present invention is not limited to the exemplary embodiments. In the explanation below, an FPGA is used as an example of a programmable device; however, it is possible to apply the present invention to other situations in which any of other various programmable devices, such as a Programmable Logic Device (PLD), is being used. In addition, in the following explanation, data that is obtained by implementing a logic circuit and is written (i.e., configured) into a programmable device will be referred to as "control data". In other words, the programmable device operates in the same manner as the logic circuit that has been converted into the control data.

Figure 1:
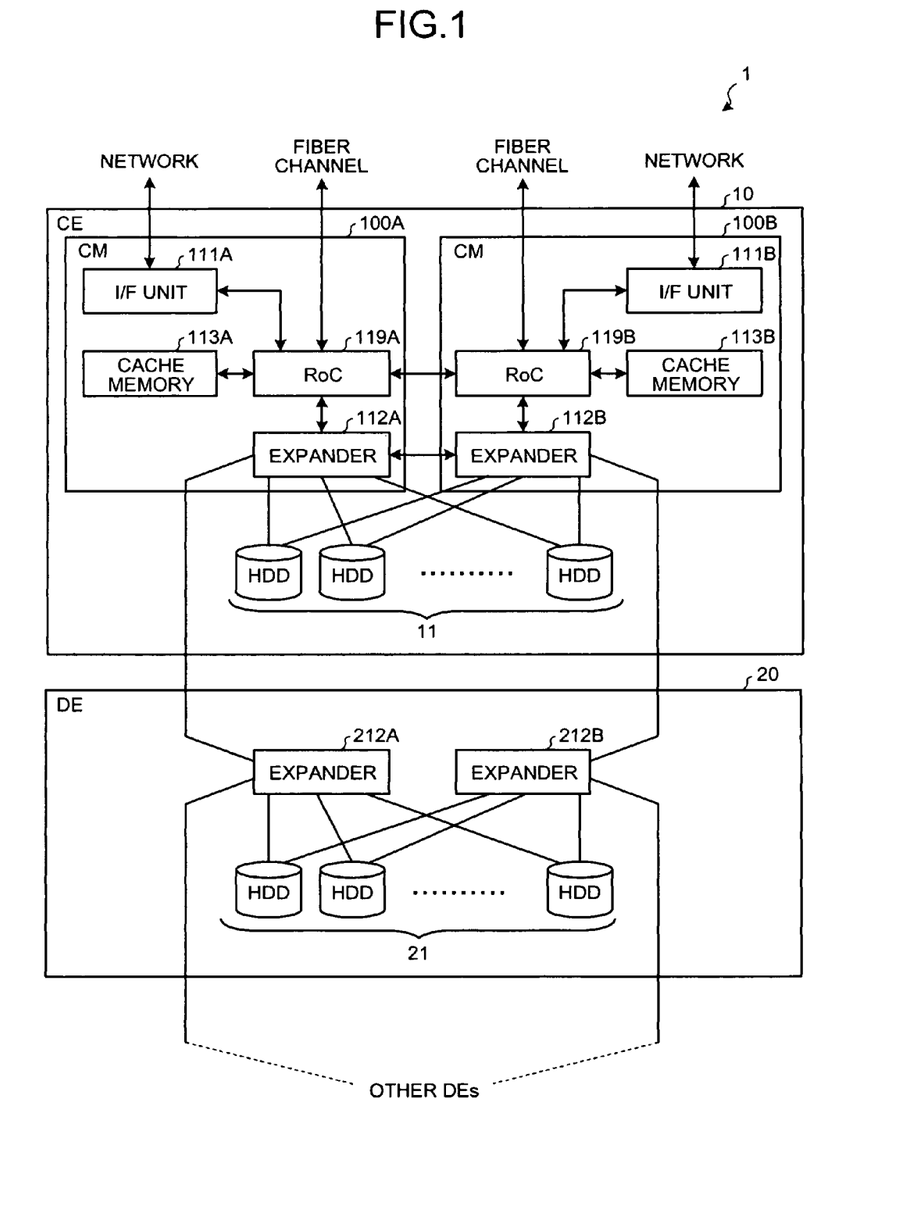
FIG. 1 is a schematic diagram of a storage device according to an embodiment of the present invention.

First, a schematic structure of a storage device according to an embodiment of the present invention will be explained. FIG. 1 is a schematic diagram of a storage device 1 according to the embodiment of the present invention. In FIG. 1, only a part of the structure is illustrated to explain the schematic structure of the storage device 1.

The storage device 1 illustrated in FIG. 1 has a dual structure to ensure high reliability and includes two of each of the constituent elements in a dual manner. (The two constituent elements provided in a dual manner are distinguished from each other by the letters A and B added to the reference numerals in FIG. 1.) Because the two constituent elements provided in a dual manner have the same functions as each other, only one of the constituent elements will be explained below.

As illustrated in FIG. 1, the casing of the storage device 1 is divided so as to include a Controller Enclosure (CE) 10 and a Device Enclosure (DE) 20. The CE 10 has installed therein, among others, functional units that control the storage device 1 and a communication module that is in charge of communications between the storage device 1 and a host computer, which is a superordinate device of the storage device 1. The DE 20 has installed therein, among others, hard disk devices.

Via a channel adaptor (not illustrated), the CE 10 is connected to the host computer through a fiber channel, which is an external device. Via expanders 112A and 112B, the CE 10 is connected to the DE 20. The DE 20 includes hard disk devices (hereinafter, "Hard Disk Drives (HDDs)") 21. It is possible to connect the DE 20 to one or more other DEs directly through the expanders 212A and 212B or via a router.

The CE 10 includes Controller Modules (CMs) 100A and 100B that control the storage device 1 and a plurality of HDDs 11 each of which is connected to the CMs 100A and 100B.

Each of the HDDs 11 is a recording device from and to which data is read and written by the CM 100A in a redundant manner. The recording devices connected to the CM 100A do not necessarily have to be hard disk devices; the recording devices may be other types of recording devices such as thermo-magnetic disc devices, magneto-optical disc devices, or semiconductor disks in which a semiconductor nonvolatile memory is used.

The CM 100A is a storage controlling device that controls the storage device 1 and includes an interface (hereinafter, "I/F") unit 111A, the expander 112A, a cache memory 113A, and a RAID-on-Chip (hereinafter, "RoC") 119A.

The I/F unit 111A is an interface used for establishing a connection to a network such as a Local Area Network (LAN). The expander 112A is a relay device that relays the data transmitted and received between the RoC 119A and the HDDs 11.

The cache memory 113A is a memory that temporarily stores therein data transferred between the host computer and the HDDs 11. The cache memory 113A may be structured by using a memory having a high level of access performance such as a Double Data Rate2 Synchronous Dynamic Random Access Memory (DDR2 SDRAM).

The RoC 119A is a controlling device that exercises overall control over the CM 100A. The RoC 119A is a type of "System on Chip" that has a memory controller and a Central Processing Unit (CPU) built therein. More specifically, for example, the RoC 119A controls an interface working with the host computer and manages the cache memory 113A.

In the structure described above, in the case where the RoC 119A has received a write instruction from the host computer indicating that data should be written, the RoC 119A stores the data into the cache memory 113A. After that, at the point in time when the data has been stored in the cache memory 113A, the RoC 119A notifies the host computer that the write process has been completed. After that, at a point in time when a predetermined condition has been satisfied, the RoC 119A writes the data stored in the cache memory 113A into the HDDs 11.

Some storage devices that use the write-back method as described above are structured so as to perform a process (i.e., a data saving process) to save the data stored in the cache memory into a nonvolatile memory in the case where an abnormal shut-down has been detected and so as to perform a process (i.e., a data restoring process) to restore the data that has been saved in the nonvolatile memory into the cache memory in the case where an electric power source is turned on after an abnormal shut-down. These processes are performed for the purpose of, as explained above, preventing the data that is stored in the cache memory and has not yet been written into the HDDs 11 from being lost.

Next, the data saving process and the data restoring process will be explained more specifically. In the following sections, to clarify characteristics of the storage device 1 according to the present embodiment, a structure of a CM (hereinafter, a "CM 110") included in a storage device (hereinafter, "storage device 0") according to a comparison example as well as various types of processes performed by the CM 110 will be explained first. After that, a structure of a CM (hereinafter, a "CM 120") included in the storage device 1 according to the present embodiment and various types of processes performed by the CM 120 will be explained.

In the following sections, as an example of an abnormal shut-down, a situation in which the electric power supply from an electric power source to the storage device has been stopped due to a power outage will be used in the explanation; however, situations in which an abnormal shut-down occurs are not limited to this example. Other situations in which, for example, the user has unplugged the power source plug while the storage device is starting up are also applicable.

Figure 2:
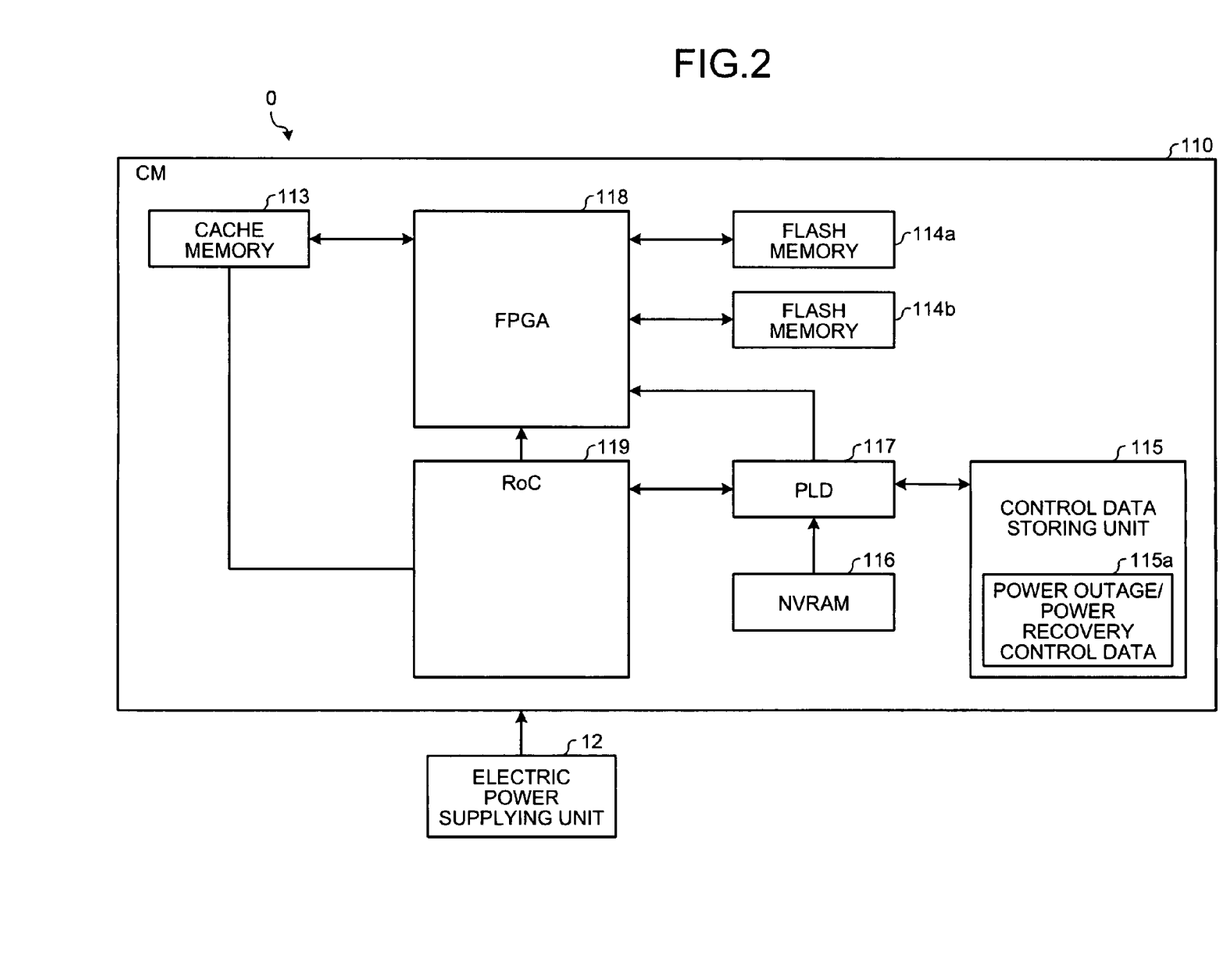
FIG. 2 is a diagram of a Controller Module (CM) included in a storage device according to a comparison example.

FIG. 2 is a diagram of the CM 110 included in the storage device 0 according to the comparison example. The schematic structure of the storage device 0 according to the comparison example is the same as the schematic structure of the storage device 1 illustrated in FIG. 1. The CM 110 illustrated in FIG. 2 corresponds to either one of the CMs 100A and 100B illustrated in FIG. 1. Further, in FIG. 2, only a part of the structure that is related to the data saving process and the data restoring process is illustrated.

As illustrated in FIG. 2, the CM 110 is connected to an electric power supplying unit 12 and includes a cache memory 113, flash memories 114a and 114b, control data storing unit 115, a Non-Volatile Random Access Memory (NVRAM) 116, a PLD 117, an FPGA 118, and a RoC 119.

The electric power supplying unit 12 is a large-capacity capacitor, a battery device, or the like that supplies electric power to the CM 110 in the case where the electric power supply from an electric power source to the storage device 0 has been stopped due to a power outage.

The cache memory 113 is a memory that, as explained above, temporarily stores therein data transferred between the host computer and the HDDs 11.

The flash memories 114a and 114b are nonvolatile memories into which the data stored in the cache memory is saved by the FPGA 118 (explained later) when a power outage has occurred. Each of the flash memories 114a and 114b is usually structured by using a NAND flash memory. In the present description, it is assumed that each of the flash memories 114a and 114b is a NAND flash memory.

The control data storing unit 115 is a memory device such as a nonvolatile memory and stores therein power outage/power recovery control data 115a to be configured into the FPGA 118 (explained later). When the power outage/power recovery control data 115a is configured into the FPGA 118, the FPGA 118 becomes capable of performing the data saving process and the data restoring process.

The NVRAM 116 is a memory device such as a nonvolatile memory and stores therein information used for, for example, judging whether a power outage has occurred. Examples of various types of information stored in the NVRAM 116 are illustrated in FIG. 3.

Figure 3:
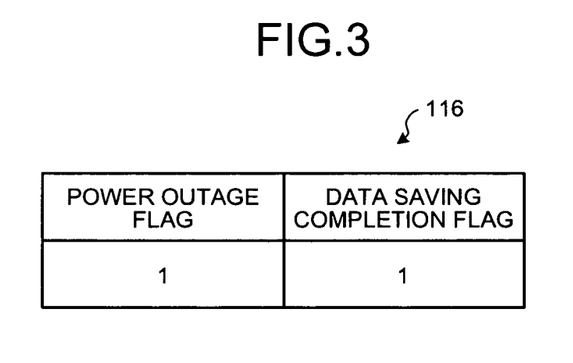
FIG. 3 is a drawing of examples of various types of information stored in a Non-Volatile Random Access Memory (NVRAM)

As illustrated in FIG. 3, the NVRAM 116 stores therein a power outage flag indicating whether a power outage has occurred and a data saving completion flag indicating whether the data saving process has been completed. In the present description, it is assumed that the power outage flag stores therein the value "1" (meaning that a power outage has occurred) in the case where a power outage has occurred and the data saving completion flag stores therein the value "1" (meaning that the saving process has been completed) in the case where the data saving process has completed.

The power outage flag and the data saving completion flag that are stored in the NVRAM 116 are updated by the PLD 117 (explained later). The process to update the power outage flag and the data saving completion flag performed by the PLD 117 will be explained later.

The PLD 117 is a device that includes various types of logic circuits that control the CM 110. The PLD 117 performs, for example, a process to configure control data into the FPGA 118, a process to update the various types of data stored in the NVRAM 116, and a process to detect that a power outage has occurred.

More specifically, after the electric power source of the storage device 0 has been turned on, the PLD 117 receives an instruction from the RoC 119 indicating that a configuration process should be performed and configures the power outage/power recovery control data 115a into the FPGA 118. The reason why the power outage/power recovery control data 115a is configured into the FPGA 118 when the electric power source has been turned on is that rewritable programmable devices like the FPGA 118 lose the control data configured therein when the electric power supply thereto has been stopped.

Further, in the case where the electric power source of the storage device 0 has been turned on, the PLD 117 obtains the power outage flag and the data saving completion flag that are stored in the NVRAM 116. After that, in the case where the obtained power outage flag indicates "1 (a power outage has occurred)", and also, the data saving completion flag indicates "1 (the saving process has been completed)", the PLD 117 notifies the RoC 119 that the electric power source has been turned on after the occurrence of a power outage.

In contrast, in the case where the obtained power outage flag does not indicate "1" (meaning that a power outage has occurred), or in the case where the data saving completion flag does not indicate "1" (meaning that the saving process has been completed), the PLD 117 notifies the RoC 119 that "the electric power source has been turned on as a normal procedure", which means that it is not that the electric power source has been turned on after the occurrence of a power outage.

Further, the PLD 117 detects whether a power outage occurs while the storage device 0 is starting up. In the case where the PLD 117 has detected that a power outage has occurred, the PLD 117 notifies the RoC 119 that a power outage has occurred and updates the power outage flag stored in the NVRAM 116 so as to indicate "1 (i.e., a power outage has occurred)". Further, when the PLD 117 has received a notification from the RoC 119 indicating that the data saving process has been completed, the PLD 117 updates the data saving completion flag stored in the NVRAM 116 so as to indicate "1" (meaning that the saving process has been completed).

The FPGA 118 is a programmable device into which predetermined control data is configured by the PLD 117. More specifically, when the electric power source of the storage device 0 has been turned on, the power outage/power recovery control data 115a is configured into the FPGA 118 by the PLD 117. As a result, the FPGA 118 becomes capable of performing the data saving process and the data restoring process. An FPGA having a scale into which it is possible to configure the power outage/power recovery control data 115a is used for structuring the FPGA 118.

Figure 4:
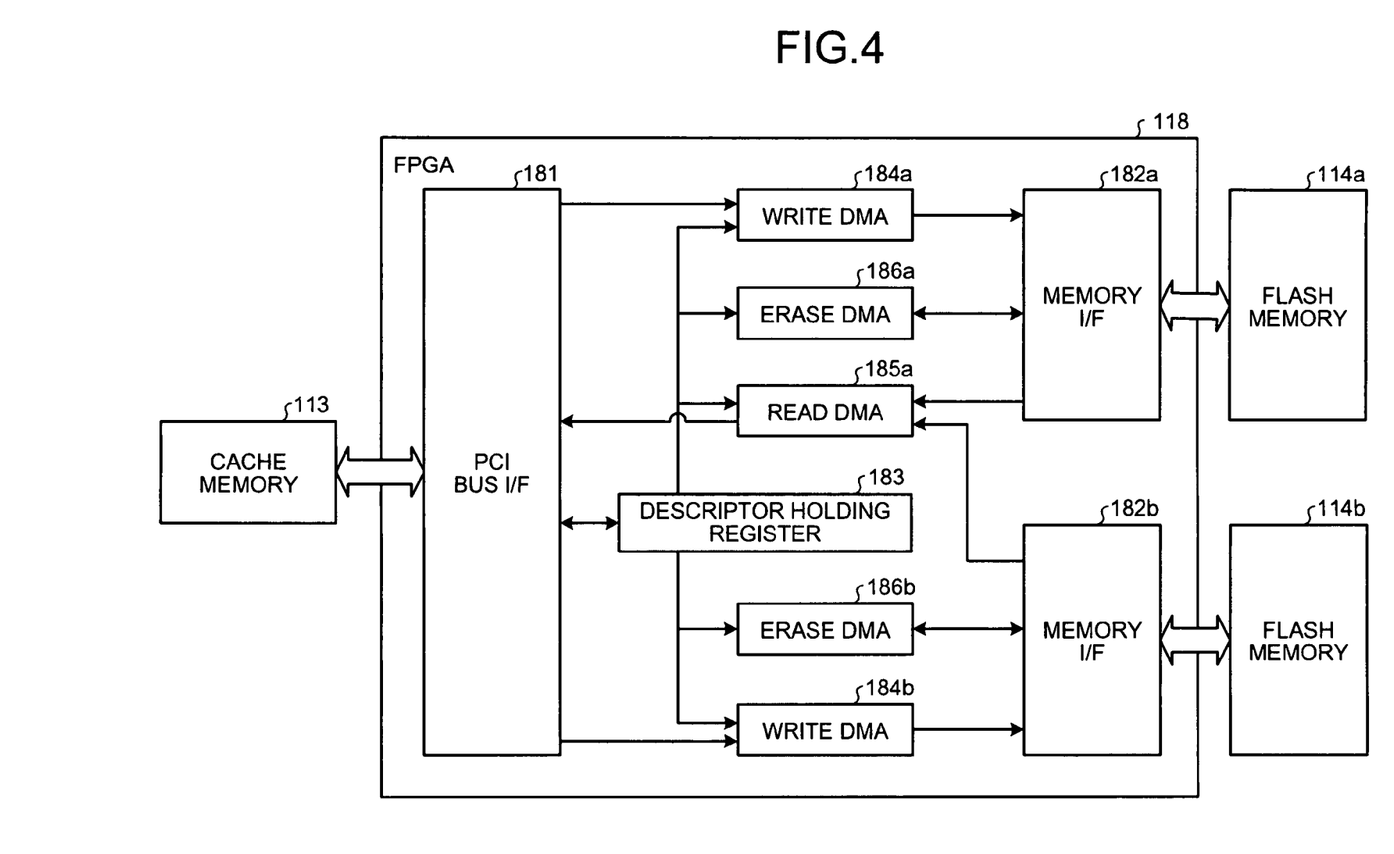
FIG. 4 is a diagram of a Field Programmable Gate Array (FPGA) into which power outage/power recovery control data has been configured.

Next, a structure of the FPGA 118 into which the power outage/power recovery control data 115a has been configured will be explained. FIG. 4 is a diagram of the FPGA 118 into which the power outage/power recovery control data 115a has been configured.

As illustrated in FIG. 4, the FPGA 118 into which the power outage/power recovery control data 115a has been configured includes a Peripheral Component Interconnect (PCI) bus I/F 181, memory I/Fs 182a and 182b, a descriptor holding register 183, write Direct Memory Access circuits (hereinafter, "write DMAs") 184a and 184b, and a read Direct Memory Access circuit (hereinafter, a "read DMA") 185a, and erase Direct Memory Access circuits (hereinafter, "erase DMAs") 186a and 186b.

The PCI bus I/F 181 is an interface that performs transmissions and receptions of data between the FPGA 118 and the cache memory 113. The memory I/F 182a is an interface that performs transmissions and receptions of data between the FPGA 118 and the flash memory 114a, whereas the memory I/F 182b is an interface that performs transmissions and receptions of data between the FPGA 118 and the flash memory 114b.

The descriptor holding register 183 is a register that stores therein instructions (i.e., descriptors) that are generated by the RoC 119 and are issued to the DMAs. More specifically, the descriptor holding register 183 holds therein, for example, a descriptor denoting a data save instruction (hereinafter, a "data save descriptor"); a descriptor denoting a data restore instruction (hereinafter, a "data restore descriptor"); and a descriptor denoting an erase instruction indicating that the data stored in the flash memories 114a and 114b should be erased (hereinafter, an "erase descriptor").

The write DMA 184a is a DMA circuit that, when having received a data save descriptor from the descriptor holding register 183, obtains the data stored in the cache memory 113 via the PCI bus I/F 181 and stores the obtained data into the flash memory 114a via the memory I/F 182a. Similarly, the write DMA 184b is a DMA circuit that, when having received a data save descriptor from the descriptor holding register 183, obtains the data stored in the cache memory 113 via the PCI bus I/F 181 and stores the obtained data into the flash memory 114b via the memory I/F 182b.

The write DMAs 184a and 184b perform, in parallel, the process to transfer the data from the cache memory 113 to the corresponding one of the flash memories 114a and 114b. As explained above, the CM 110 according to the comparison example includes the dual flash memories 114a and 114b as the storage areas used for saving the data therein. Further, the dual write DMAs 184a and 184b are configured into the FPGA 118 so that the write DMAs 184a and 184b perform the data saving process in parallel. With these arrangements, a system is realized in which the data saving process is efficiently performed when a power outage has occurred. As a result, it is possible to complete the data saving process within a short period of time during which the electric power is supplied from the electric power supplying unit 12.

The read DMA 185a is a DMA circuit that transfers the data stored in the flash memories 114a and 114b to the cache memory 113. More specifically, in the case where the read DMA 185a has received a data restore descriptor from the descriptor holding register 183 indicating that the data stored in the flash memory 114a should be transferred to the cache memory 113, the read DMA 185a obtains the data stored in the flash memory 114a via the memory I/F 182a and stores the obtained data into the cache memory 113 via the PCI bus I/F 181.

Further, in the case where the read DMA 185a has received a data restore descriptor indicating that the data stored in the flash memory 114b should be transferred to the cache memory 113, the read DMA 185a obtains the data stored in the flash memory 114b via the memory I/F 182b and stores the obtained data into the cache memory 113 via the PCI bus I/F 181. As explained above, in the CM 110 according to the comparison example, the single read DMA 185a is configured into the FPGA 118 so that the read DMA 185a performs the data restoring process.

Next, reasons why the data saving process is performed by the dual write DMAs 184a and 184b, whereas the data restoring process is performed by the single read DMA 185a will be explained. It is because, although there is a restriction that the data saving process needs to be completed within a short period of time during which the electric power is supplied from the electric power supplying unit 12, the data restoring process has no such restriction. It is also because a large-scale FPGA would be required to realize an FPGA that includes dual write DMAs and dual read DMAs, and problems of an increase in the FPGA installation area and an increase in the cost would arise.

The erase DMA 186a is a DMA circuit that, when having received an erase descriptor from the descriptor holding register 183, erases the data stored in the flash memory 114a.

Similarly, the erase DMA 186b is a DMA circuit that, when having received an erase descriptor from the descriptor holding register 183, erases the data stored in the flash memory 114b.

Returning to the description of FIG. 2, the RoC 119 is a controlling device that exercises overall control over the CM 110. In the case where the electric power source of the storage device 0 has been turned on, the RoC 119 instructs the PLD 117 to configure the power outage/power recovery control data 115a into the FPGA 118.

Further, in the case where the RoC 119 has received a notification from the PLD 117 indicating that a power outage has occurred, the RoC 119 instructs the FPGA 118 to perform the data saving process. More specifically, the RoC 119 generates a data save descriptor, stores the generated data save descriptor into the descriptor holding register 183, forwards the stored data save descriptor to the write DMAs 184a and 184b, and instructs the write DMAs 184a and 184b to perform the data saving process in parallel.

Further, in the case where the RoC 119 has received a notification from the PLD 117 indicating that the electric power source has been turned on after occurrence of a power outage, the RoC 119 instructs the FPGA 118 to perform the data restoring process. More specifically, the RoC 119 instructs that the data restoring process should be performed, by generating a data restore descriptor, storing the generated data restore descriptor into the descriptor holding register 183, and forwarding the stored data restore descriptor to the read DMA 185a. After that, the RoC 119 generates an erase descriptor, stores the generated erase descriptor into the descriptor holding register 183, forwards the stored erase descriptor to the erase DMAs 186a and 186b, and instructs the erase DMAs 186a and 186b to perform an erase process in parallel.

Figure 5:
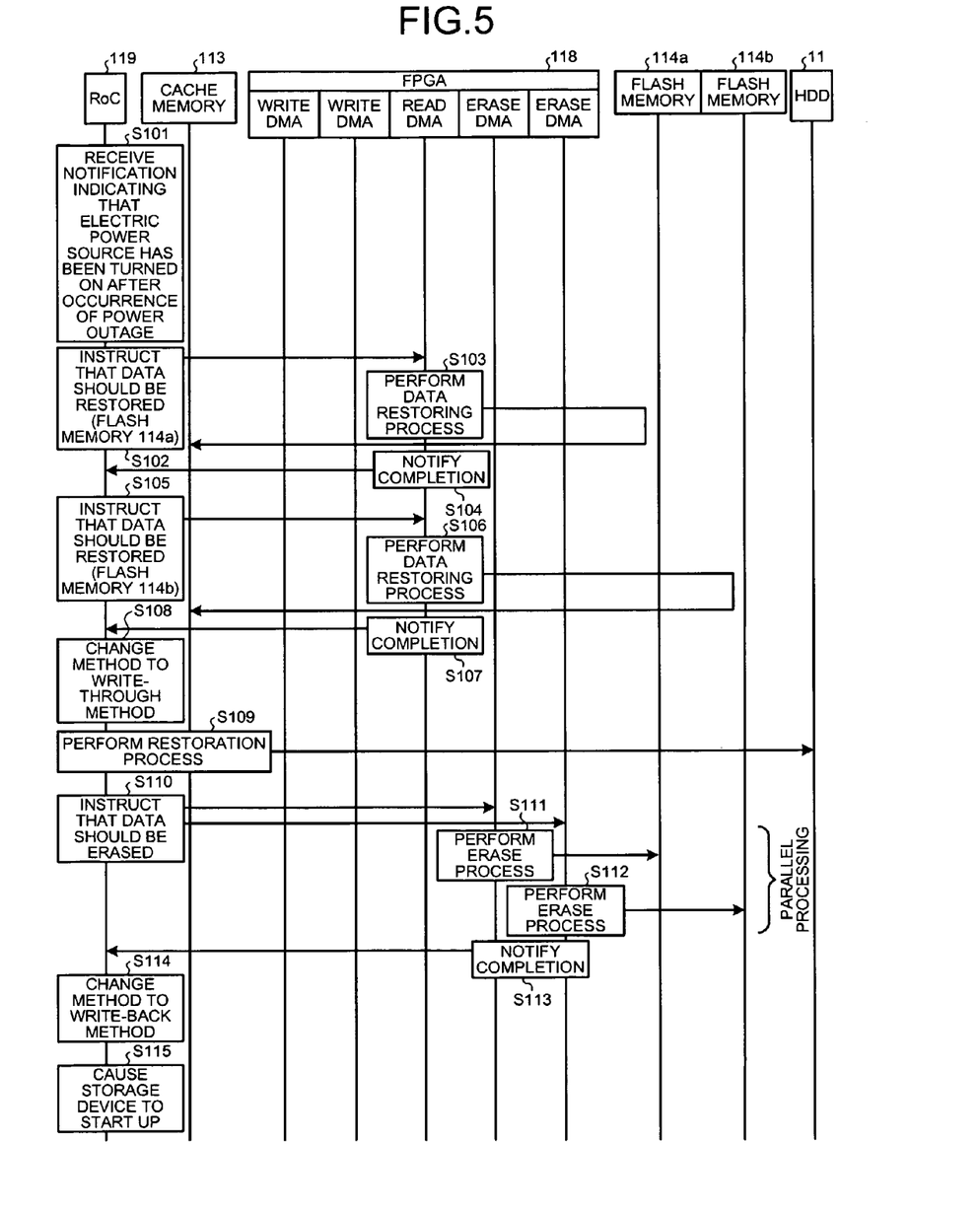
FIG. 5 is a sequence chart for explaining a flow in a data restoring process performed by the CM included in the storage device according to the comparison example.

Next, the data restoring process performed by the CM 110 included in the storage device 0 according to the comparison example will be explained. FIG. 5 is a sequence chart for explaining a flow in the data restoring process performed by the CM 110 included in the storage device 0 according to the comparison example.

As illustrated in FIG. 5, after the electric power source of the storage device 0 has been turned on, when the RoC 119 receives a notification from the PLD 117 indicating that the electric power source has been turned on after occurrence of a power outage (step S101), the RoC 119 generates a data restore descriptor indicating that the data should be transferred from the flash memory 114a to the cache memory 113. Subsequently, the RoC 119 stores the generated data restore descriptor into the descriptor holding register 183, forwards the stored data restore descriptor to the read DMA 185a, and instructs the read DMA 185a to perform the data restoring process (step S102).

When receiving the data restore descriptor, the read DMA 185a stores the data stored in the flash memory 114a into the cache memory 113 (step S103). After the data restoring process has been completed, the read DMA 185a notifies the RoC 119 that the data transfer from the flash memory 114a to the cache memory 113 has been completed (step S104).

When having received the completion notification, the RoC 119 generates a data restore descriptor indicating that the data should be transferred from the flash memory 114b to the cache memory 113. After that, the RoC 119 stores the generated data restore descriptor into the descriptor holding register 183, forwards the stored data restore descriptor to the read DMA 185a, and instructs the read DMA 185a to perform the data restoring process (step S105).

When receiving the data restore descriptor, the read DMA 185a stores the data stored in the flash memory 114b into the cache memory 113 (step S106). After the data restoring process has been completed, the read DMA 185a notifies the RoC 119 that the data transfer from the flash memory 114b to the cache memory 113 has been completed (step S107).

Subsequently, the RoC 119 changes the method used for performing a data write process to the write-through method (step S108) and performs a restoration process (i.e., a flush back) to store the data stored in the cache memory 113 into the HDDs 11 (step S109). As a result, there is no such data in the cache memory 113 that has not yet been written to the HDDs 11.

After that, the RoC 119 generates an erase descriptor, stores the generated erase descriptor into the descriptor holding register 183, forwards the stored erase descriptor to the erase DMAs 186a and 186b, and instructs the erase DMAs 186a and 186b to erase the data stored in the flash memories 114a and 114b (step S110).

When receiving the erase descriptor, the erase DMA 186a erases the data stored in the flash memory 114a (step S111), whereas the erase DMA 186b erases the data stored in the flash memory 114b (step S112). When the erase process has been completed, the erase DMAs 186a and 186b notify the RoC 119 that the erase process has been completed (step S113).

A reason why the erase process needs to be performed is that, for the purpose of storing a new piece of data into each of the flash memories 114a and 114b that are each structured with a NAND flash memory, it is necessary to erase the data that is stored therein. In other words, it is because the flash memories 114a and 114b need to be prepared for occurrence of a next power outage by erasing the data stored in the flash memories 114a and 114b after the data restoring process has been completed.

When receiving the notification indicating that the erase process has been completed, the RoC 119 changes the method used for performing a data write process to the write-back method (step S114) and causes the storage device 0 to start up (step S115).

As explained above, in the storage device 0 according to the comparison example, the dual write DMAs 184a and 184b are configured into the FPGA 118. As a result, a system is realized in which the data saving process is completed within a short period of time during which the electric power is supplied from the electric power supplying unit 12. Further, although it takes time to complete the data restoring process because the data restoring process is performed by the single read DMA 185a, it is possible to prevent the scale of the FPGA 118 from enlarging and to prevent the cost from increasing.

In the CM 110 included in the storage device 0 according to the comparison example, however, after the data transfer from the flash memory 114a to the cache memory 113 has been completed, the data transfer from the flash memory 114b to the cache memory 113 is performed. Thus, the storage device 0 according to the comparison example is not able to shorten the time period required by the data restoring process. As a result, the storage device 0 according to the comparison example is not capable of further shortening the time period it takes to start up after an abnormal shut-down.

To cope with this situation, the storage device 1 according to the present embodiment realizes a system in which the data saving process is performed at a high speed as well as the data restoring process is performed at a high speed, without the need to enlarge the scale of the FPGA serving as a data transfer circuit. In the following sections, the storage device 1 according to the present embodiment will be explained in detail, with reference to FIGS. 6 to 8.

Figure 6:
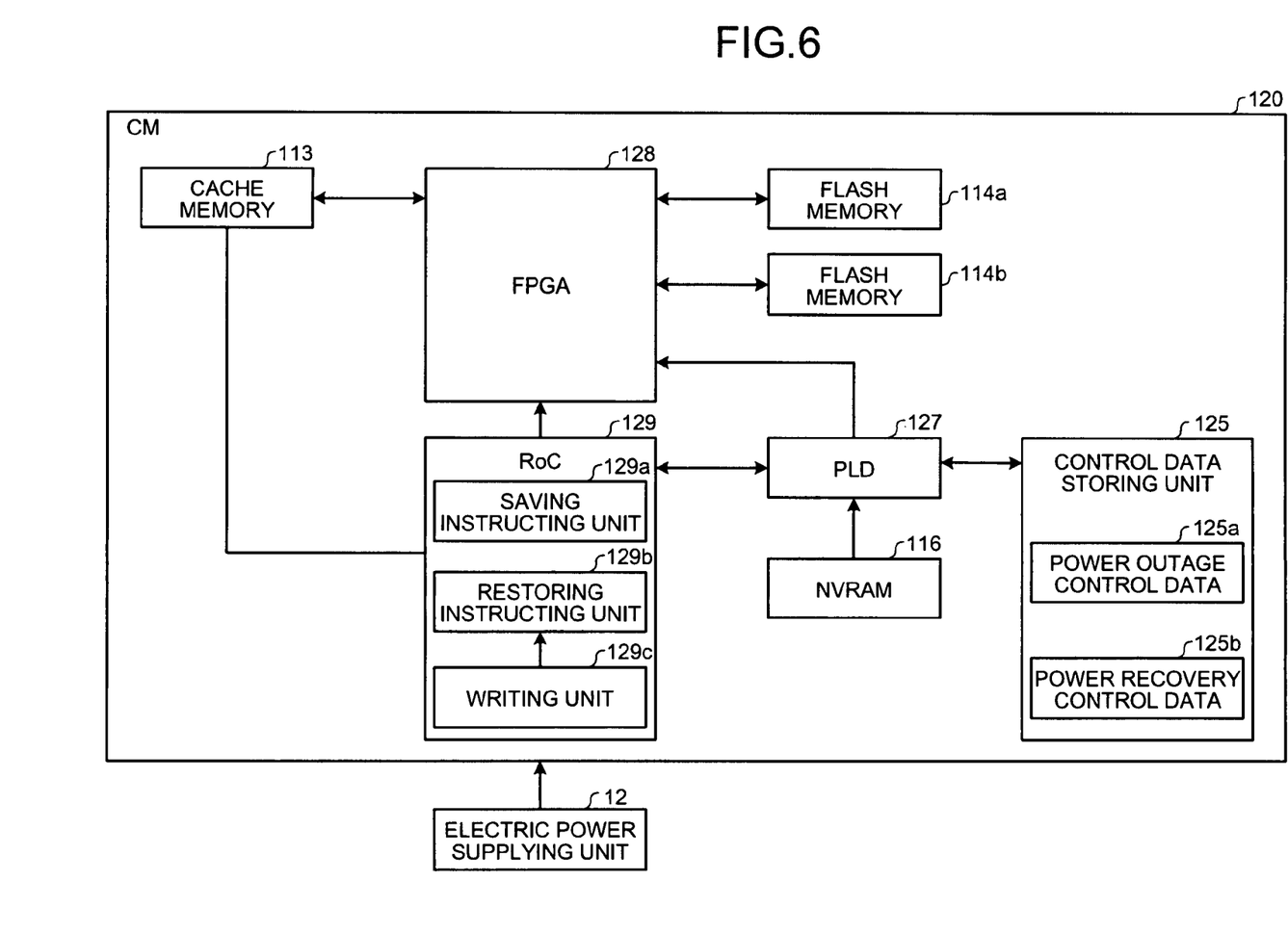
FIG. 6 is a diagram of a CM included in the storage device according to the embodiment of the present invention.

FIG. 6 is a diagram of the CM 120 included in the storage device 1 according to the present embodiment. The CM 120 illustrated in FIG. 6 corresponds to either one of the CMs 100A and 100B illustrated in FIG. 1. Further, in the following sections, some of the constituent elements that have the same functions as those illustrated in FIG. 2 will be referred to by using the same reference characters, and the detailed explanation thereof will not be repeated.

As illustrated in FIG. 6, the CM 120 is connected to the electric power supplying unit 12 and includes the cache memory 113, the flash memories 114a and 114b, the NVRAM 116, a control data storing unit 125, a PLD 127, an FPGA 128, and a RoC 129. In FIG. 6, an example in which electric power is supplied to the CM 120 by the electric power supplying unit 12 provided on the outside of the CM 120 is illustrated; however, another arrangement is acceptable in which the CM 120 includes the electric power supplying unit 12.

The control data storing unit 125 is a memory device such as a nonvolatile memory and stores therein power outage control data 125a and power recovery control data 125b. The power outage control data 125a is control data that causes the FPGA 128 to become capable of performing a data saving process. More specifically, the FPGA 128 into which the power outage control data 125a has been configured is capable of performing the data saving process by employing the dual write DMAs.

It should also be noted that the power outage control data 125a does not include any control data used for performing the data restoring process, which is an unnecessary process when a power outage has occurred. In other words, the FPGA 128 into which the power outage control data 125a has been configured includes no read DMA. A structure of the FPGA 128 into which the power outage control data 125a has been configured will be explained in detail later.

The power recovery control data 125b is control data that causes the FPGA 128 to become capable of performing a data restoring process when an electric power source has been turned on after an abnormal shut-down. More specifically, the FPGA 128 into which the power recovery control data 125b has been configured is capable of performing the data restoring process by employing the dual read DMAs.

It should also be noted that the power recovery control data 125b does not include any control data used for performing the data saving process, which is an unnecessary process when the electric power source has been turned on after an abnormal shut-down. In other words, the FPGA 128 into which the power recovery control data 125b has been configured includes no write DMA. A structure of the FPGA 128 into which the power recovery control data 125b has been configured will be explained in detail later.

The PLD 127 is a device that includes various types of logic circuits that control the CM 120. The PLD 127 performs, for example, a process to update the various types of data stored in the NVRAM 116, a process to detect that a power outage has occurred, and a process to configure control data into the FPGA 128.

More specifically, when the electric power source of the storage device 1 has been turned on, the PLD 127 obtains the power outage flag and the data saving completion flag that are stored in the NVRAM 116. After that, in the case where the obtained power outage flag indicates "1" (meaning that a power outage has occurred), and also, the data saving completion flag indicates "1" (meaning that the saving process has been completed), the PLD 127 notifies the RoC 129 that the electric power source has been turned on after occurrence of a power outage.

In contrast, in the case where the obtained power outage flag does not indicate "1" (meaning that a power outage has occurred), or in the case where the data saving completion flag does not indicate "1" (meaning that the saving process has been completed), the PLD 127 notifies the RoC 129 that the electric power source has been turned on as a normal procedure.

Further, the PLD 127 detects whether a power outage occurs while the storage device 1 is starting up. In the case where the PLD 127 has detected that a power outage has occurred, the PLD 127 notifies the RoC 129 that a power outage has occurred and updates the power outage flag stored in the NVRAM 116 so as to indicate "1" (meaning that a power outage has occurred). Further, when the PLD 127 has received a notification from the RoC 129 indicating that the data saving process has been completed, the PLD 127 updates the data saving completion flag stored in the NVRAM 116 so as to indicate "1" (meaning that the saving process has been completed).

In addition, according to an instruction from a writing unit 129c (explained later) included in the RoC 129, the PLD 127 configures the power outage control data 125a or the power recovery control data 125b stored in the control data storing unit 125 into the FPGA 128.

In FIG. 6, the example is illustrated in which the PLD 127 realizes, for example, the process to update the various types of data stored in the NVRAM 116, the process to detect that a power outage has occurred, and the process to configure the control data into the FPGA 128; however, another arrangement is acceptable in which these processes are realized by an element (e.g., a Large Scale Integration [LSI] chip) other than the PLD.

The FPGA 128 is a programmable device into which the power outage control data 125a or the power recovery control data 125b is configured by the PLD 127. An FPGA having a scale into which it is possible to configure the power outage control data 125a and to configure the power recovery control data 125b is used for structuring the FPGA 128. In other words, the scale of an FPGA that is required to configure the power outage control data 125a therein shall be compared with the scale of an FPGA that is required to configure the power recovery control data 125b therein, so that an FPGA having a scale into which it is possible to configure the control data requiring the larger scale is used for structuring the FPGA 128.

Figure 7A:
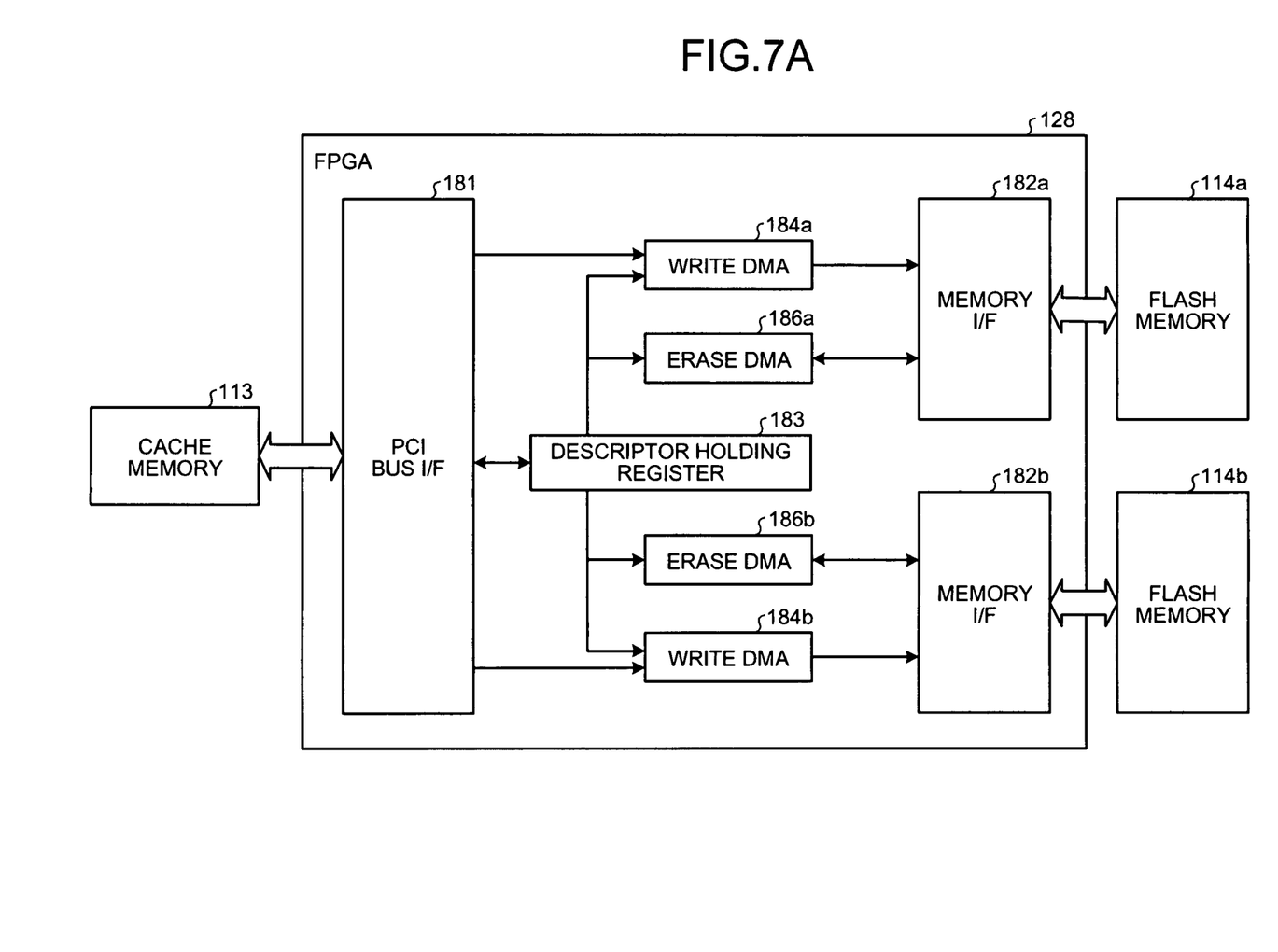
FIG. 7A is a diagram of an FPGA into which power outage control data has been configured.

Next, a structure of the FPGA 128 into which the power outage control data 125a has been configured and a structure of the FPGA 128 into which the power recovery control data 125b has been configured will be explained. FIG. 7A is a diagram of the FPGA 128 into which the power outage control data 125a has been configured. In the following sections, some of the constituent elements that have the same functions as those illustrated in FIG. 4 will be referred to by using the same reference characters, and the detailed explanation thereof will not be repeated.

As illustrated in FIG. 7A, the FPGA 128 into which the power outage control data 125a has been configured includes the dual write DMAs 184a and 184b and the dual erase DMAs 186a and 186b. In other words, unlike the FPGA 118 illustrated in FIG. 4 into which the power outage/power recovery control data 115a has been configured, the FPGA 128 illustrated in FIG. 7A does not include the read DMA 185a.

Figure 7B:
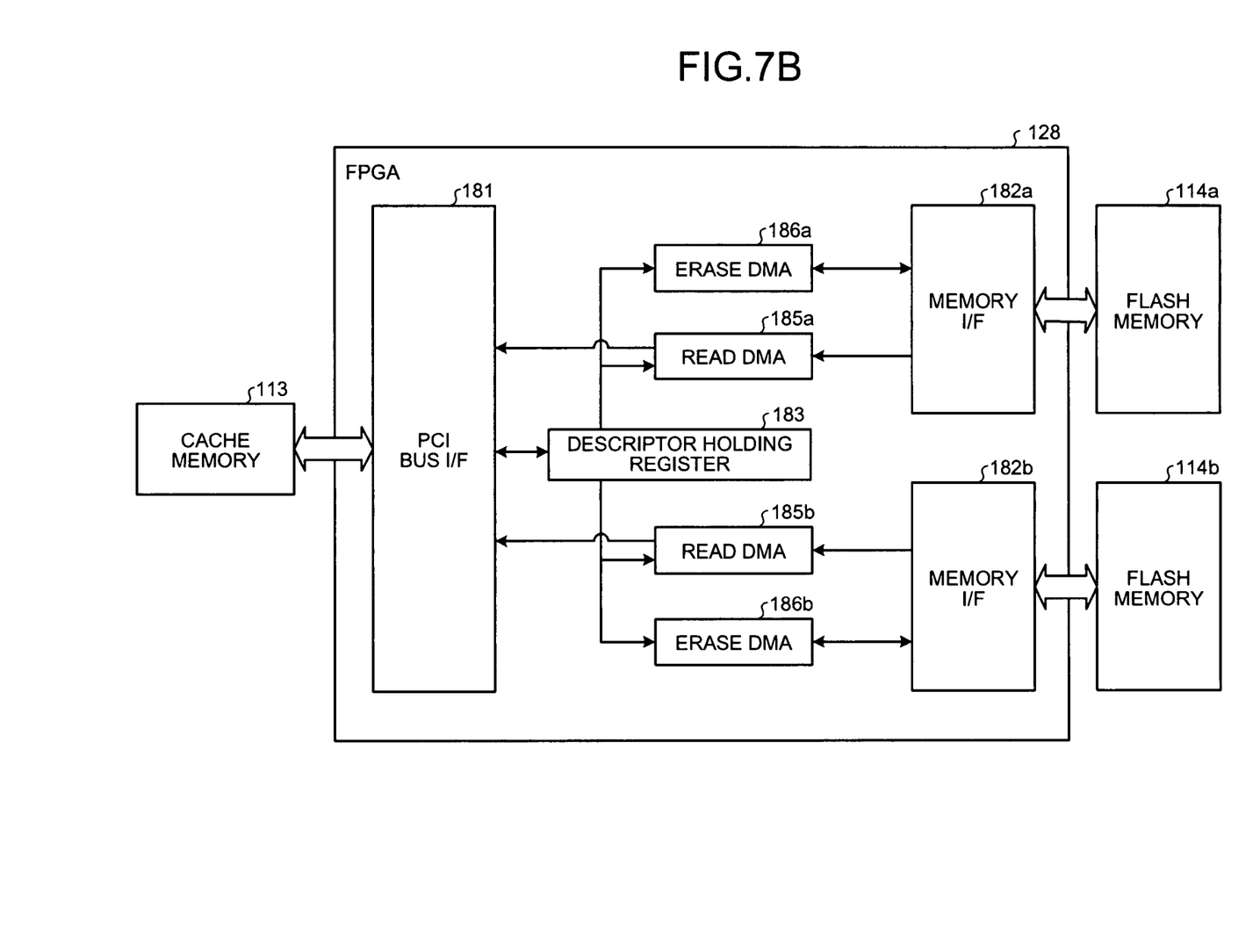
FIG. 7B is a diagram of the FPGA into which power recovery control data has been configured.

FIG. 7B is a diagram of the FPGA 128 into which the power recovery control data 125b has been configured. As illustrated in FIG. 7B, the FPGA 128 into which the power recovery control data 125b has been configured includes dual read DMAs 185a and 185b and the dual erase DMAs 186a and 186b. In other words, unlike the FPGA 118 illustrated in FIG. 4 into which the power outage/power recovery control data 115a has been configured, the FPGA 128 illustrated in FIG. 7B does not include the write DMAs 184a and 184b, but additionally includes the read DMA 185b.

In the case where the read DMA 185a has received a data restore descriptor from the descriptor holding register 183, the read DMA 185a stores the data stored in the flash memory 114a into the cache memory 113. Similarly, in the case where the read DMA 185b has received a data restore descriptor from the descriptor holding register 183, the read DMA 185b stores the data stored in the flash memory 114b into the cache memory 113. The read DMAs 185a and 185b perform, in parallel, the process to transfer the data from the corresponding one of the flash memories 114a and 114b to the cache memory 113.

As illustrated in FIGS. 7A and 7B, the storage device 1 according to the present embodiment is structured in such a manner that the FPGA 128 includes a smaller number of DMA circuits than the FPGA 118 according to the comparison example does. Thus, it is possible to use an FPGA having a smaller scale. As a result, it is possible to reduce the cost of the FPGA. In addition, as illustrated in FIG. 7B, because the FPGA 128 is structured in such a manner that the dual read DMAs 185a and 185b perform the data restoring process in parallel, it is possible to efficiently perform the data restoring process. Consequently, it is possible to shorten the time period it takes for the storage device 1 to start up after an abnormal shut-down.

Returning to the description of FIG. 6, the RoC 129 is a controlling unit that exercises overall control over the CM 120 and includes a saving instructing unit 129a, a restoring instructing unit 129b, and the writing unit 129c. The saving instructing unit 129a is a processing unit that, when having received a notification from the PLD 127 indicating that a power outage has occurred, instructs the FPGA 128 to perform the data saving process. More specifically, the saving instructing unit 129a generates a data save descriptor, stores the generated data save descriptor into the descriptor holding register 183, forwards the stored data save descriptor to the write DMAs 184a and 184b, and instructs the write DMAs 184a and 184b to perform the data saving process in parallel.

The restoring instructing unit 129b is a processing unit that, when having received a notification from the PLD 127 indicating that the electric power source has been turned on after occurrence of a power outage, instructs the FPGA 128 to perform the data restoring process. More specifically, the restoring instructing unit 129b generates a data restore descriptor, stores the generated data restore descriptor into the descriptor holding register 183, forwards the stored data restore descriptor to the read DMAs 185a and 185b, and instructs the read DMAs 185a and 185b to perform the data restoring process in parallel.

Further, in the case where the data restoring process performed by the FPGA 128 has been completed, the restoring instructing unit 129b generates an erase descriptor, stores the generated erase descriptor into the descriptor holding register 183, forwards the stored erase descriptor to the erase DMAs 186a and 186b, and instructs the erase DMAs 186a and 186b to perform the erase process in parallel.

The writing unit 129c is a processing unit that instructs the PLD 127 to configure the power outage control data 125a or the power recovery control data 125b into the FPGA 128.

More specifically, in the case where the writing unit 129c has received a notification from the PLD 127 indicating that the electric power source has been turned on as a normal procedure, the writing unit 129c instructs the PLD 127 to write (i.e., to configure) the power outage control data 125a into the FPGA 128. As a result, the FPGA 128 is structured as illustrated in FIG. 7A, has become capable of performing the data saving process by employing the dual write DMAs 184a and 184b, and is thus prepared for occurrence of a power outage.

Further, in the case where the writing unit 129c has received a notification from the PLD 127 indicating that the electric power source has been turned on after occurrence of a power outage, the writing unit 129c instructs the PLD 127 to write (i.e., to configure) the power recovery control data 125b into the FPGA 128. As a result, the FPGA 128 is structured as illustrated in FIG. 7B and has become capable of performing the data restoring process by employing the dual read DMAs 185a and 185b.

Furthermore, in the case where the writing unit 129c has received a notification from the FPGA 128 indicating that the data saving process and the erase process have been completed, the writing unit 129c instructs the PLD 127 to write (i.e., to configure) the power outage control data 125a.

Figure 8:
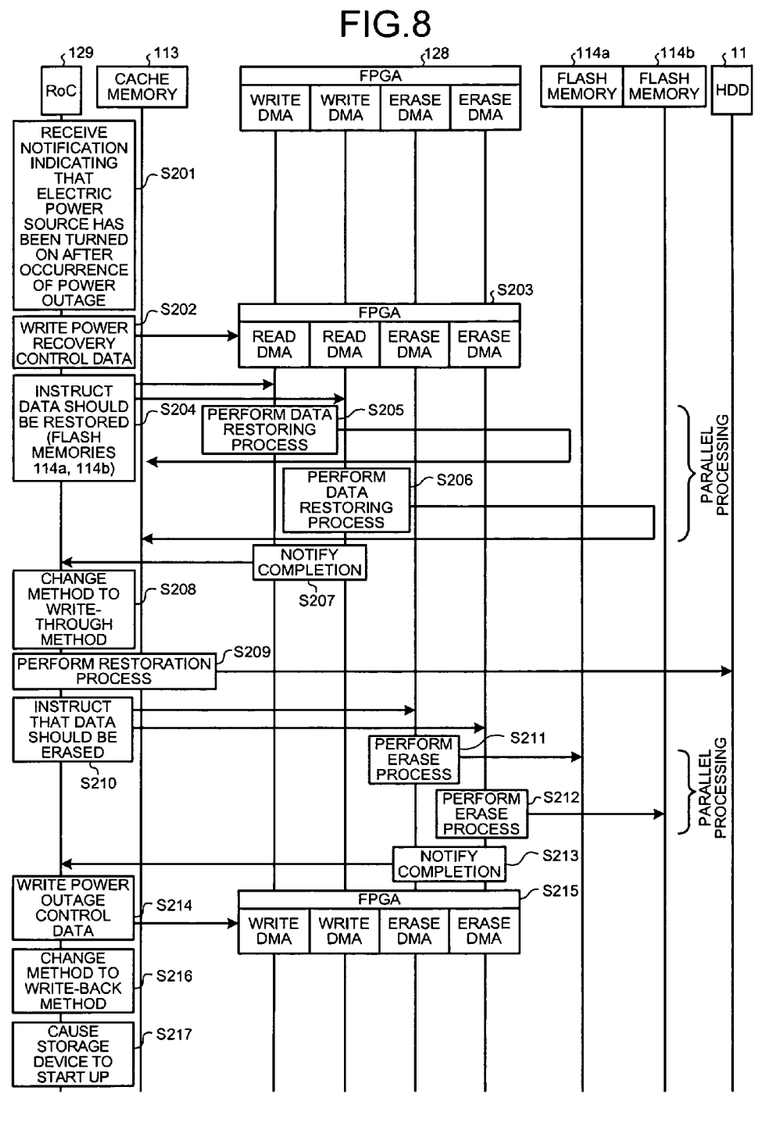
FIG. 8 is a sequence chart for explaining a flow in a data restoring process performed by the CM included in the storage device according to the embodiment of the present invention.

Next, the data restoring process performed by the CM 120 included in the storage device 1 according to the present embodiment will be explained. FIG. 8 is a sequence chart for explaining a flow in the data restoring process performed by the CM 120 included in the storage device 1 according to the present embodiment.

As illustrated in FIG. 8, after the electric power source of the storage device 1 has been turned on, when the RoC 129 receives a notification from the PLD 127 indicating that the electric power source has been turned on after occurrence of a power outage (step S201), the writing unit 129c included in the RoC 129 instructs the PLD 127 to configure the power recovery control data 125b (step S202). As a result, the FPGA 128 is structured so as to include the dual read DMAs 185a and 185b, as illustrated in FIG. 7B (step S203).

Subsequently, the restoring instructing unit 129b included in the RoC 129 generates a data restore descriptor, stores the generated data restore descriptor into the descriptor holding register 183, forwards the stored data restore descriptor to the read DMAs 185a and 185b, and instructs the read DMAs 185a and 185b to perform the data restoring process in parallel (step S204).

When having received the data restore descriptor, the read DMA 185a stores the data stored in the flash memory 114a into the cache memory 113 (step S205). Similarly, when having received the data restore descriptor, the read DMA 185b stores the data stored in the flash memory 114b into the cache memory 113 (step S206). The read DMAs 185a and 185b perform the data restoring process in parallel. After the data restoring process has been completed, the read DMAs 185a and 185b notify the RoC 119 that the data restoring process has been completed (step S207).

When receiving the completion notification, the RoC 129 changes the method used for performing a data write process to the write-through method (step S208) and performs a restoration process to store the data stored in the cache memory 113 into the HDDs 11 (step S209).

Subsequently, the restoring instructing unit 129b included in the RoC 129 generates an erase descriptor, stores the generated erase descriptor into the descriptor holding register 183, forwards the stored erase descriptor to the erase DMAs 186*a* and 186*b*, and instructs the erase DMAs 186*a* and 186*b* to erase the data stored in the flash memories 114*a* and 114*b* (step S210).

When receiving the erase descriptor, the erase DMA 186*a* erases the data stored in the flash memory 114*a* (step S211), whereas the erase DMA 186*b* erases the data stored in the flash memory 114*b* (step S212). After the erase process has been completed, the erase DMAs 186*a* and 186*b* notify the RoC 129 that the erase process has been completed (step S213).

When having received the notification indicating that the erase process has been completed, the writing unit 129*c* included in the RoC 129 instructs the PLD 127 to configure the power outage control data 125*a* (step S214). As a result, the FPGA 128 is structured so as to include the dual write DMAs 184*a* and 184*b* as illustrated in FIG. 7A (step S215), and is thus prepared for occurrence of a power outage. Although the storage device 1 according to the present embodiment is required to perform the process of configuring the power outage control data 125*a* (i.e., a re-configuring process), because the storage device 1 is able to perform the data restoring process in parallel by employing the dual read DMAs 185*a* and 185*b*, it is possible to shorten, as a whole, the processing time period it takes for the storage device 1 to start up after an abnormal shut-down.

After that, the RoC 129 changes the method used for performing a data write process to the write-back method (step S216) and causes the storage device to start up (step S217).

As explained above, the storage device 1 according to the present embodiment is structured in such a manner that, when the electric power source has been turned on after occurrence of a power outage, the power recovery control data 125*b* is configured into the FPGA 128 so that the storage device 1 starts up after the dual read DMAs 185*a* and 185*b* perform the data restoring process. Thus, it is possible to shorten the time period it takes for the storage device 1 to start up after an abnormal shut-down.

Further, the storage device 1 according to the present embodiment is structured in such a manner that, after the data restoring process has been completed, the power outage control data 125*a* is configured into the FPGA 128 so that it is possible to perform the data saving process by employing the dual write DMAs 184*a* and 184*b*. Thus, even in the case where a power outage has occurred after the storage device 1 had started up, it is possible to efficiently perform the data saving process.

Further, the storage device 1 according to the present embodiment is structured in such a manner that the FPGA 128 into which the power outage control data 125*a* has been configured includes the dual write DMAs 184*a* and 184*b*, but does not include any read DMA, which is unnecessary for the data saving process. Also, the storage device 1 according to the present embodiment is structured in such a manner that the FPGA 128 into which the power recovery control data 125*b* has been configured includes the dual read DMAs 185*a* and 185*b*, but does not include any write DMA, which is unnecessary for the data restoring process. Consequently, it is possible to make the scale of the FPGA 128 according to the present embodiment smaller than the scale of the FPGA 118 according to the comparison example. As a result, it is possible to reduce the cost of the storage device 1.

In other words, by using the storage device 1 according to the present embodiment, it is possible to efficiently perform the data saving process and the data restoring process, without the need to enlarge the scale of the FPGA serving as the data transfer circuit.

In the description of the exemplary embodiments above, the example is explained in which the dual write DMAs 184*a* and 184*b* perform the data saving process, whereas the dual read DMAs 185*a* and 185*b* perform the data restoring process, on the premise that the storage device 1 includes the dual flash memories 114*a* and 114*b* as the memory devices used for saving the data therein; however, the present invention is not limited to this example. It is possible to apply the present invention to a storage device that includes a single memory device used for saving the data therein or to a storage device that includes three or more memory devices used for saving the data therein.

To explain these examples more specifically, in the case where, for instance, the storage device includes a single memory device used for saving the data therein, a single write DMA performs the data saving process, whereas a single read DMA performs the data restoring process. In other words, the storage device would be required to use an FPGA having a scale to include the single write DMA and the single read DMA at the same time; however, if the present invention is applied, it is possible to use an FPGA having a scale to include only either the single write DMA or the single read DMA. As a result, it is possible to keep the scale of the FPGA small and to reduce the cost of the storage device.

Unless otherwise noted particularly, it is possible to arbitrarily modify the processing procedures, the controlling procedures, the specific names, and the information including the various types of data and parameters that are presented in the text above and in the drawings. The constituent elements of the devices that are illustrated in the drawings are based on functional concepts. Thus, it is not necessary to physically structure the elements as indicated in the drawings. In other words, the specific mode of distribution and integration of the devices is not limited to the ones illustrated in the drawings. It is acceptable to functionally or physically distribute or integrate all or a part of the devices in any arbitrary units, depending on various loads and the status of use. Further, all or an arbitrary part of the processing functions performed by the devices may be realized by a CPU and a computer program that is analyzed and executed by the CPU or may be realized as hardware using wired logic.

Other valid modes of the present invention include methods, apparatuses, systems, computer programs, recording media, data structures to which the constituent elements, the representations, or any arbitrary combination of the constituent elements of the storage devices disclosed in the present application are applied.

When the storage device according to an aspect of the invention disclosed in the present application is used, an advantageous effect is achieved where it is possible to efficiently perform the process of saving the data stored in the cache memory into the nonvolatile memory and the process of restoring the data saved in the nonvolatile memory into the cache memory, without the need to enlarge the scale of the data transfer circuit. In other words, an advantageous effect is achieved where it is possible to shorten the time period it takes for the storage device to start up after an abnormal shut-down, without increases in the installation area and in the cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage device comprising:
a programmable device that realizes a first function of a circuit and a second function of a circuit corresponding to control data written in the programmable device, the programmable device realizing the first function when first control data is written in the programmable device, the first function including a first interface connecting to a cache memory, a second interface connecting to a nonvolatile memory, a writing circuit configured to save data stored in the cache memory into the nonvolatile memory, and an erase circuit configured to erase the data that has been stored in the nonvolatile memory;
a saving instructing unit that instructs the programmable device with the first function to save the data stored in the cache memory into the nonvolatile memory;
a writing unit that writes second control data instead of the first control data into the programmable device to change the first function without a reading circuit into the second function without the writing circuit, when electric power supply is resumed after occurrence of an abnormal shut-down of the storage device, the second function including the first interface, the second interface, the erase circuit, and a plurality of reading circuits configured to restore, in parallel, the data that has been saved in the nonvolatile memory into the cache memory when the second control data is written in the programmable device; and
a restoring instructing unit that instructs the plurality of reading circuits of the programmable device with the second function to restore, in parallel, the data that has been saved in the nonvolatile memory into the cache memory,
wherein the writing unit rewrites the first control data in place of the second control data when a data restoring process is completed as instructed by the restoring instructing unit.

2. The storage device according to claim 1, wherein when the electric power supply is resumed after occurrence of the abnormal shut-down of the storage device, the writing unit writes the second control data specifying the second function which includes the plurality of reading circuits into the programmable device, and
the restoring instructing unit instructs the programmable device to perform, in parallel, a process to restore data saved in a plurality of nonvolatile memories into the cache memory.

3. The storage device according to claim 2, wherein
when the data restoring process is completed as instructed by the restoring instructing unit, the writing unit writes the first control data specifying the first function which includes a plurality of writing circuits into the programmable device.

4. The storage device according to claim 1, wherein
the writing unit writes either the first control data or the second control data into the programmable device which has lost, due to losing electric power supply, control data previously written by the writing unit.

5. The storage device according to claim 1, wherein
the writing unit writes the first control data into the programmable device when electric power supply is resumed after occurrence of a normal shut-down of the storage device.

6. The storage device according to claim 1, wherein
when the data restoring process is completed and the data stored in the nonvolatile memory is erased, the writing unit writes the first control data specifying the first function which includes a plurality of writing circuits into the programmable device.

7. The storage device according to claim 1, wherein
the writing unit writes the second control data specifying the second function which includes a plurality of reading circuits into the programmable device.

8. A storage controlling device controlling a storage device including a programmable device that realizes a first function of a circuit and a second function of a circuit corresponding to control data written in the programmable device, the programmable device realizing the first function when first control data is written in the programmable device, the first function including a first interface connecting to a cache memory, a second interface connecting to a nonvolatile memory, a writing circuit configured to save data stored in the cache memory into the nonvolatile memory, and an erase circuit configured to erase the data that has been stored in the nonvolatile memory, the storage controlling device comprising:
a saving instructing unit that instructs the programmable device with the first function to save the data stored in the cache memory into the nonvolatile memory;
a writing unit that writes second control data instead of the first control data into the programmable device to change the first function without a reading circuit into the second function without the writing circuit, when electric power supply is resumed after occurrence of an abnormal shut-down of the storage device, the second function including the first interface, the second interface, the erase circuit, and a plurality of reading circuits configured to restore, in parallel, the data that has been saved in the nonvolatile memory into the cache memory when the second control data is written in the programmable device; and
a restoring instructing unit that instructs the plurality of reading circuits of the programmable device with the second function to restore, in parallel, the data that has been saved in the nonvolatile memory into the cache memory,
wherein the writing unit rewrites the first control data in place of the second control data when a data restoring process is completed as instructed by the restoring instructing unit.

9. The storage controlling device according to claim 8, wherein when the electric power supply is resumed after occurrence of the abnormal shut-down of the storage device, the writing unit writes the second control data specifying the second function which includes the plurality of reading circuits into the programmable device, and
the restoring instructing unit instructs the programmable device to perform, in parallel, a process to restore data saved in a plurality of nonvolatile memories into the cache memory.

10. The storage controlling device according to claim 9, wherein
when the data restoring process is completed as instructed by the restoring instructing unit, the writing unit writes the first control data specifying the first function which includes a plurality of writing circuits into the programmable device.

11. The storage controlling device according to claim 8, wherein the writing unit writes either the first control data or the second control data into the programmable device which has lost, due to losing electric power supply, control data previously written by the writing unit.

12. The storage controlling device according to claim 8, wherein the writing unit writes the first control data into the programmable device when electric power supply is resumed after occurrence of a normal shut-down of the storage device.

13. A storage controlling method for a storage controlling device that controls a storage device, the method comprising:

first writing first control data into a programmable device that realizes a first function of a circuit and a second function of a circuit corresponding to control data written in the programmable device, the first control data specifying the first function which includes a first interface connecting to a cache memory, a second interface connecting to a nonvolatile memory, a writing circuit configured to save data stored in the cache memory into the nonvolatile memory, and an erase circuit configured to erase the data that has been stored in the nonvolatile memory;

first instructing the programmable device with the first function to save the data stored in the cache memory into the nonvolatile memory;

second writing second control data instead of the first control data into the programmable device to change the first function without a reading circuit into the second function without the writing circuit, when electric power supply is resumed after occurrence of an abnormal shut-down of the storage device, the second function including the first interface, the second interface, the erase circuit, and a plurality of reading circuits configured to restore, in parallel, the data that has been saved in the nonvolatile memory into the cache memory when the second control data is written in the programmable device;

second instructing the plurality of reading circuits of the programmable device with the second function to restore, in parallel, the data that has been saved in the nonvolatile memory into the cache memory; and rewriting the first control data in place of the second control data when a data restoring process is completed as instructed in the second instructing.

14. The storage controlling method according to claim 13, wherein the second writing includes writing the second control data specifying the second function which includes the plurality of reading circuits into the programmable device, and the second instructing includes instructing the programmable device to perform, in parallel, a process to restore data saved in a plurality of nonvolatile memories into the cache memory.

15. The storage controlling method according to claim 14, wherein the first writing and the rewriting include writing the first control data specifying the first function which includes a plurality of writing circuits into the programmable device.

16. The storage controlling method according to claim 13, wherein the first writing and the second writing include writing either the first control data or the second control data into the programmable device which has lost, due to losing electric power supply, control data previously written.

17. The storage controlling method according to claim 13, wherein the second writing includes writing the first control data into the programmable device when electric power supply is resumed after occurrence of a normal shut-down of the storage device.

\* \* \* \* \*